United States Patent [19]

Lakshmanan

[11] 4,075,149
[45] Feb. 21, 1978

[54] AQUEOUS UREA-FORMALDEHYDE RESIN COMPOSITIONS HAVING IMPROVED STORAGE LIFE

[75] Inventor: Pallavoor R. Lakshmanan, Houston, Tex.

[73] Assignee: Gulf Research & Development Company, Pittsburgh, Pa.

[21] Appl. No.: 771,608

[22] Filed: Feb. 24, 1977

Related U.S. Application Data

[63] Continuation-in-part of Ser. No. 589,335, June 23, 1975, abandoned.

[51] Int. Cl.² ............................................. C08L 61/24
[52] U.S. Cl. ............................................. 260/29.4 R
[58] Field of Search ............................ 260/29.4, 69 R

[56] References Cited
U.S. PATENT DOCUMENTS 2,438,244  5/1944  Dearing .................................. 260/29

Primary Examiner—Theodore E. Pertilla
Attorney, Agent, or Firm—Richard L. Kelly

[57] ABSTRACT

Urea-formaldehyde resin compositions having improved (longer) storage lives are provided by incorporating minor quantities of salts of certain complexed zinc ions into concentrated urea-formaldehyde resin compositions. The complexed zinc salts that can be employed for this purpose include zinc-ammonia carbonate and zinc-ammonia sulfate.

5 Claims, No Drawings

AQUEOUS UREA-FORMALDEHYDE RESIN COMPOSITIONS HAVING IMPROVED STORAGE LIFE

CROSS-REFERENCE TO RELATED APPLICATION

This application is a continuation-in-part of my earlier application, Ser. No. 589,335, filed on June 23, 1975, now abandoned.

BACKGROUND OF THE INVENTION

Urea-formaldehyde resin compositions are employed in large quantities for diverse industrial purposes. Such resin compositions typically are prepared by condensing 1.5 – 2.0 mols of formaldehyde with 1 mol of urea i an aqueous medium under weakly acidic or mildly alkaline conditions. After the condensation has been carried out, the ph is adjusted to about 7 or slightly higher, and water is evaporated from the resin solution to increase the solids content of the resin compositions to the order of 60 – 75% by weight.

Urea-formaldehyde resin compositions of the type described above tend to polymerize when stored at ambient temperature, the rate of polymerization increasing with temperature. The polymerization of such resins is noted by an increase in the viscosity of the resin compositions. Accordingly, careful control of inventories of such resin compositions is required so that the resins do not polymerize to the extent that they cannot thereafter be used for their intended purpose.

Considerable studies have been made of methods for preparing such aqueous resin compositions which are free of the undesirable tendency to polymerize at ambient temperature. While minor reductions in the tendency to polymerize in storage can be obtained by careful manufacturing processes, virtually all aqueous urea-formaldehyde resin compositions nevertheless polymerize during storage.

SUMMARY OF THE INVENTION

In accordance with the present invention, the applicant has discovered that the tendency of aqueous urea-formaldehyde resin compositions to polymerize in storage can be significantly retarded by incorporating into such resin compositions minor quantities of salts of complexed zinc ions having the structure:

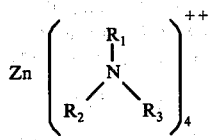

where $R_1$, $R_2$ and $R_3$ are independently selected from the group consisting of hydrogen atoms and lower alkyl groups containing up to 5 carbon atoms.

DETAILED DESCRIPTION OF THE INVENTION

The present invention is based upon the applicant's discovery that the tendency of aqueous urea-formaldehyde resin compositions to polymerize in storage can be reduced significantly by incorporating into such resin compositions minor quantities of salts of a complexed zinc ion of the formula set forth above. Typically the complexed zinc ion included in such salts will be a zinc-ammonia ion, i.e., $Zn(NH_3)_4^{++}$. The salt of the complexed zinc ion should be employed in the amount of about 0.1 to about 4.0 and preferably about 0.2 to about 0.6 weight % of the total composition.

The aqueous urea-formaldehyde resin compositions employed in the practice of the invention ordinarily will contain at least 50% by weight of urea-formaldehyde solids. The urea-formaldehyde resins will contain at least about 1.5 mols of formaldehyde permol of urea with the preferred resins containing about 1.5 – 2.0 mols of formaldehyde per mol of urea.

The aqueous urea-formaldehyde resin compositions employed in the invention can be prepared by techniques well known in the art. Ordinarily, the urea and formaldehyde will be charged to a stirred reaction vessel in the appropriate molar ratio and the pH of the reaction system will be adjusted to the alkaline side with ammonium hydroxide. The reaction mixture will be refluxed under these conditions until substantially all of the formaldehyde has been reacted with the urea. Thereafter, water will be distilled from the reaction mixture until the solids content of the system has been increased to approximately 50 – 75 weight %. Alternatively, the pH of the system may be maintained slightly on the acid side during the condensation reaction and then adjusted to the alkaline side with ammonium hydroxide before distilling water from the composition. For reasons subsequently developed in greater detail, the urea-formaldehyde resin solution must have a pH greater than 7.0 and the pH must be maintained on the alkaline side with ammonium hydroxide as the sole alkali.

The salts of complexed zinc ions employed in the invention contain complexed cations formed between zinc cations and ammonia or lower alkyl amines such as methyl amine. Such complexes are believed to contain 4 mols of ammonia (or an equivalent amine) per mol of zinc. These complexed zinc ions can be prepared by simply adding an appropriate quantity of ammonium hydroxide (or an equivalent aqueous amine solution) to an aqueous solution of a zinc salt such as zinc carbonate or zinc sulfate. Alternatively, zinc oxide can be added to an ammonical solution of an ammonium salt such as ammonium sulfate. The zinc oxide is solubilized to form the corresponding zinc ammonia complexed salt.

Ordinarily it is preferred practice to prepare a relatively concentrated aqueous solution of the complexed zinc salt and add this concentrate to the aqueous urea-formaldehyde resin composition. Alternatively, the complexed zinc ion can be formed in situ in the urea-formaldehyde resin composition by adding thereto appropriate sources of zinc ions and suitable anions, e.g., a solution of a zinc salt such as zinc carbonate or zinc sulfate. As the urea-formaldehyde resin compositions employed in the invention contain ammonium hydroxide and ammonium salts - usually formed by periodic addition of acids such as formic acid and ammonium hydroxide to control pH during manufacture - the zinc ions added will react with the ammonia present in the solution to form the zinc-ammonia complexed ion.

Compositions of optimum storage life are obtained when the zinc salt employed is a zinc complexed salt of a relatively weak acid. Examples of such salts include zinc complexed salts of organic acids such as acetic acid, benzoic acid, and the like. Zinc-ammonia carbonate is especially preferred for use in the invention.

As is well-known, zinc-ammonia complexed salts (or their ions) exist in equilibrium with the uncomplexed zinc salt (or their ions) and free ammonia, viz:

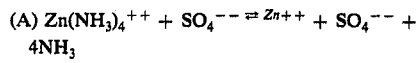

As noted earlier herein, the aqueous urea-formaldehyde resin solutions employed in the invention have a pH of greater than 7.0 and contain ammonium hydroxide and in some cases ammonium salts such as ammonium formate. The use of such resin solutions is dictated by the consideration that they provide a large excess of ammonia (or ammonium ions) over that required by the stoichiometry of Formula A. Equilibrium considerations cause virtually all of the zinc to exist in the zinc-ammonia complex under these conditions.

Nothwithstanding their long storage life at ambient temperature, the resin compositions of the invention cure quite rapidly at elevated temperatures. Possibly the ammonia present as illustrated in formula A is volatilized at elevated curing temperatures and the uncomplexed zinc salt is generated in accordance with formula A and catalyzes rapid cure of the resin.

The following examples are set forth to illustrate more clearly the principle and practice of this invention to those skilled in the art. Where parts or percentages are set forth in the examples, they are parts and percentages on a weight basis.

RESIN COMPOSITION A

A resin of 60% solids, having a formaldehyde-urea mol ratio of 1.65:1, and having a viscosity of "O" on the Gardner-Holdt scale was prepared. A stirred reactor was charged with the required quantities of 50% formalin and urea. After an initial 15-minute reflux, the pH was adjusted to 6.5 with formic acid and reflux was continued to the desired viscosity. The pH then was adjusted to 7.5 with 28% ammonium-hydroxide and the resin solution was concentrated to 60% solids by vacuum distillation.

RESIN COMPOSITION B

A second resin similar to Resin A was prepared except that the formalin and urea were charged to provide a formaldehyde-urea mol ratio of 1.84:1.

EXAMPLE 1

2 parts of a finely-divided zinc oxide was thoroughly dispersed in 100 parts of Resin Composition A. The zinc oxide reacted with the ammonium formate and ammonium hydroxide present in the resin to form complexed zinc-ammonia formate. This composition and Resin Composition A were stored at 95° F. over a period of 24 days. The viscosity of the two solutions at 95° F. was measured periodically with a Brookfield RVP apparatus employing a No. 4 spindle at 100 RPM. The results are set forth in Table I below.

Table I

| Resin Composition | Days | Viscosity, cps | | | | | | | | | |
|---|---|---|---|---|---|---|---|---|---|---|---|
| | | 3 | 5 | 6 | 7 | 10 | 12 | 14 | 17 | 19 | 24 |
| Control | | 324 | 372 | 406 | 440 | 524 | 758 | 910 | 1300 | 1924 | * |
| Control & Zinc-Ammonia Ion | | 332 | 354 | 410 | 430 | 480 | 660 | 766 | 922 | 1240 | 2500 |

The data show that the zinc-ammonia formate formed in situ was effective in retarding the polymerization of the resin as measured by increase in the viscosity of the resin solution.

EXAMPLE 2

A fast curing resin composition was prepared by adding 0.125% of ammonium sulfate to Resin Composition B. The zinc sulfate was added as a 12.5% aqueous solution. This composition sets up as a gel within 6 hours when stored at 75° F.

Four similar resin compositions were prepared by adding to Resin Composition B 0.125% of ammonium sulfate and, respectively, 0.05, 0.10, 0.15 and 0.20% of zinc oxide. The zinc oxide was dispersed in the resin composition before the ammonium sulfate was added as a 12.5% aqueous solution. The zinc oxide reacted with the added ammonium sulfate and the ammonium formate and free ammonium hydroxide present in Resin Composition B to form complexed zinc-ammonium ions. These compositions, which had an initial Brookfield viscosity of 210, were stored for 42 days at 75° F. The final Brookfield viscosities, measured at 75° F. using a #3 Spindle at 100 RPM, are set forth in Table II.

Table II

| % ZnO Charged to Composition | Brookfield Viscosity, cps |
|---|---|
| 0.05 | 3520 |
| 0.10 | 494 |
| 0.15 | 490 |
| 0.20 | 478 |

These data show that the complexed zinc-ammonia ion formed in situ is effective in retarding the polymerization of an acid catalyzed resin composition which gels in 6 hours in the absence of the complexed zinc ammonia ions.

Despite their good storage characteristics, these resin compositions cure quite rapidly at elevated temperatures. Each of the compositions had a gel time (cure time) of less than 30 minutes at 240° F.

EXAMPLE 3

A fast curing resin composition was prepared by adding 0.25% ammonium sulfate and 0.15% zinc oxide to Resin Composition B. The manner of addition of the zinc oxide and the ammonium sulfate was as described in Example 2. Again the complexed zinc-ammonia ion was formed by in situ reaction. After 42 days storage at 75° F., the Brookfield viscosity at 75° F. (measured with a #3 Spindle at 100 RPM) was only 585 cps. The gel time (cure time) at 240° F. was only 18 minutes.

EXAMPLE 4

A fast curing resin composition was prepared by adding the equivalent of 0.125% ammonium sulfate and 0.1% zinc carbonate to Resin Composition B. The zinc carbonate and ammonium sulfate were added as a concentrated aqueous solution which had been prepared by dissolving 10 parts of zinc carbonate, 12.5 parts ammonium sulfate and 77.5 parts of 28% ammonium hydroxide solution in 100 parts of water. After 42 days storage at 75° F., the composition had a Brookfield viscosity (measured with a #3 Spindle at 100 RPM) of only 610 cps. The composition had a gel time (cure time) of 20 minutes at 240° F.

Comparable results are obtained when the zinc carbonate in Example 4 is replaced with zinc acetate or zinc citrate.

I claim:

1. A method for preparing an aqueous solution of a urea-formaldehyde resin having a reduced tendency to polymerize at ambient temperature, which consists essentially of heating one mol of urea with 1.5 – 2.0 mols of formaldehyde in an aqueous medium, adjusting the pH of the resulting resin solution to a value greater than 7.0 by adding ammonium hydroxide to the solutions as the sole alkali, concentrating the resin solution by distillation so that it contains at least 50% by weight of resin solids, and incorporating into the resin solution a minor quantity of a salt of a complexed zinc ion sufficient to retard the rate of polymerization of the urea-formaldehyde resin at ambient temperature, said complexed zinc ion having the structure:

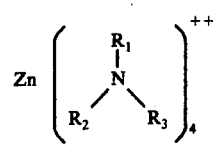

where $R_1$, $R_2$ and $R_3$ are independently selected from the group consisting of hydrogen atoms and lower alkyl groups containing up to 5 carbon atoms.

2. An aqueous solution of a urea-formaldehyde resin having a reduced tendency to polymerize at ambient temperature and prepared by the method of claim 1.

3. A resin solution of claim 2 in which the salt of the complexed zinc ion constitutes about 0.1 to 4.0 weight % of the total composition.

4. A resin solution of claim 3 in which the salt of the complexed zinc ion is zinc ammonia carbonate.

5. A resin solution of claim 3 in which the salt of the complexed zinc ion is zinc ammonia sulfate.

* * * * *

UNITED STATES PATENT OFFICE
CERTIFICATE OF CORRECTION

Patent No. 4,075,149          Dated February 21, 1978

Inventor(s) Pallavoor R. Lakshmanan

It is certified that error appears in the above-identified patent and that said Letters Patent are hereby corrected as shown below:

In column 1 at the end of line 16, delete "i" and insert ... in ... .

In column 3 immediately below Table I, the following is inserted ... *Too viscous to measure using a No. 4 spindle ... .

Signed and Sealed this

Thirtieth Day of May 1978

[SEAL]

Attest:

RUTH C. MASON
Attesting Officer

LUTRELLE F. PARKER
Acting Commissioner of Patents and Trademarks